United States Patent [19]

Carman et al.

[11] Patent Number: 4,805,657

[45] Date of Patent: Feb. 21, 1989

[54] METHOD AND APPARATUS FOR REMOTE CONTROL OF AN UNDERWATER VALVE

[75] Inventors: R. Jan Carman, Sugar Land; Michael R. Fitzgibbons; James A. Sweety, both of Houston, all of Tex.

[73] Assignee: Ferranti Subsea Systems, Inc., Sugar Land, Tex.

[21] Appl. No.: 163,985

[22] Filed: Feb. 29, 1988

[51] Int. Cl.⁴ .............................................. F16K 31/46
[52] U.S. Cl. ................................ 137/68.2; 137/236.1; 251/68
[58] Field of Search .................... 137/68.1, 68.2, 236.1; 251/67, 68

[56] References Cited

U.S. PATENT DOCUMENTS

| | | |
|---|---|---|
| 3,017,894 | 1/1962 | Chilcoat . |
| 3,306,317 | 2/1967 | Brown ........................ 251/67 X |
| 3,900,211 | 8/1975 | Russell et al. . |
| 3,902,447 | 9/1975 | Slocum . |
| 4,095,421 | 6/1978 | Silcox . |
| 4,284,143 | 8/1918 | Scherrer et al. . |
| 4,434,621 | 3/1984 | Barbeau ........................ 137/68.2 X |
| 4,533,114 | 8/1985 | Cony et al. ........................ 251/67 |
| 4,619,285 | 10/1928 | Piet . |
| 4,667,736 | 5/1987 | Rumbaugh et al. . |

OTHER PUBLICATIONS

Installation, Operation and Maintenance of Subsea Acoutic Valve Operation System—Savos.
FutureCraft 381 Series Reusable Explosive Operated Valves.
Danfoss Hydraulic Double-Acting Rotary Actuator.
Grove B-5 Ball Valves.

*Primary Examiner*—A. Michael Chambers
*Assistant Examiner*—John C. Fox
*Attorney, Agent, or Firm*—Browning, Bushman, Zamecki & Anderson

[57] ABSTRACT

Improved techniques are provided for opening or closing an underwater valve in a subsea fluid pipeline utilizing an acoustic signal transmitted from the surface to a receiver adjacent the valve. A predetermined torquing force is applied to a shaft directly coupled to the valve stem, although rotation of the valve stem is prevented by the mechanical connection of an explosive bolt. Receipt of the transmitted acoustic signal initiates the release of stored electrical energy which detonates the explosive bolt and breaks the mechanical connection, thereby enabling the pre-existing torquing force to rotate the valve stem. Valve operation reliability is significantly increased, since the torquing force for operating the valve is applied before the valve is installed in the subsea environment.

20 Claims, 2 Drawing Sheets

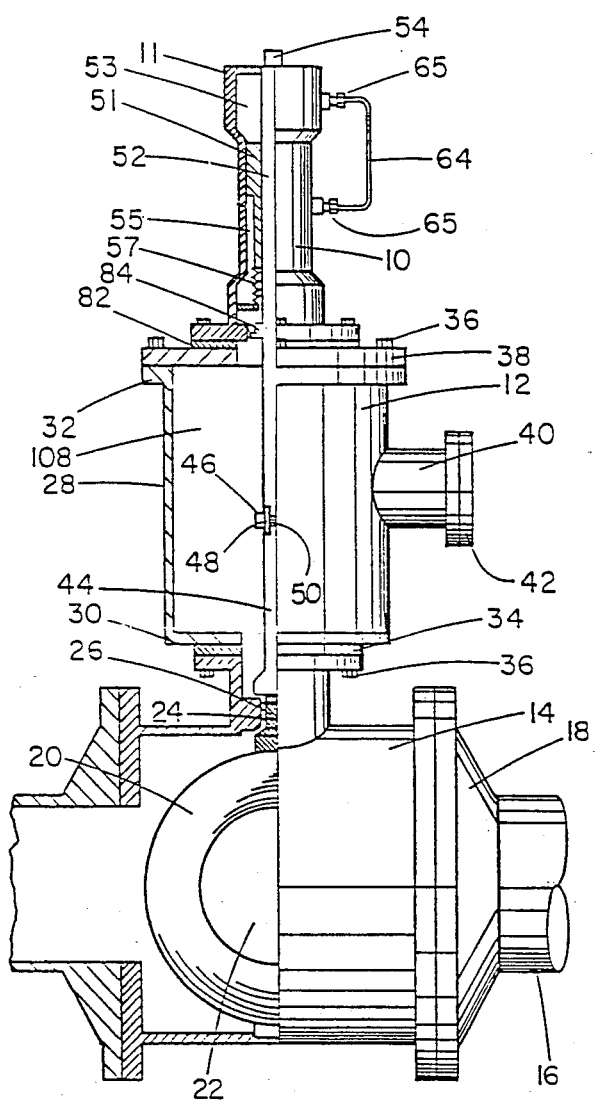
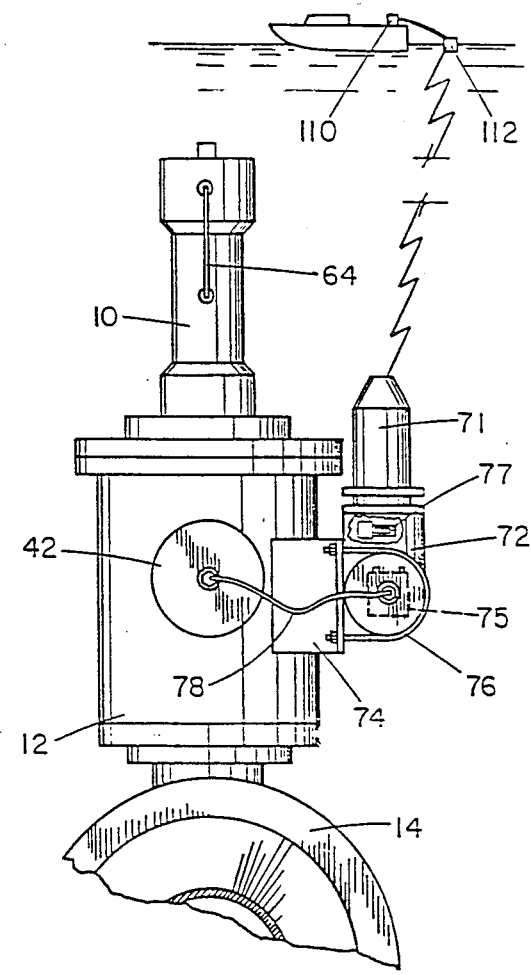
FIG. 1
FIG. 2

METHOD AND APPARATUS FOR REMOTE CONTROL OF AN UNDERWATER VALVE

FIELD OF THE INVENTION

The present invention relates to remote operation of a valve and, more particularly, to techniques for the one-time remote operation of a valve in an underwater fluid transmission pipeline.

BACKGROUND OF THE INVENTION

Various techniques have been devised for remotely operating valves. Fluid control lines and electrical wires have long been utilized for transmitting operational signals to remotely positioned valves, thereby significantly reducing the time and expense of achieving valve operation. Numerous automated remote control systems provide feedback from the remote valve to the central station indicative of the operational position of the valve, thereby enhancing computer control and increasing system reliability.

Fluid control conduits or electrical cables are frequently not used, however, for controlling subsurface valves due to the high installation and repair costs for such conduits or cables, poor reliability, and/or governmental regulations. As an alternative, acoustically transmitted signals have been proposed for operating certain remotely positioned valves, including subsurface valves. U.S. Pat. No. 3,902,447 discloses operation of subsea control valves in a mooring system to release compressed air into ballast tanks and thus change bouyancy. U.S. Pat. No. 4,095,421 discloses the use of sonic signals transmitted through water to generate electrical pulses, which then actuate relays to regulate operation of control valves, which in turn control blowout preventers in an offshore oil well. U.S. Pat. No. 4,284,143 briefly discloses the use of acoustic signals for either transmitting control signals to or for transmitting data from a subsurface satellite well. U.S. Pat. No. 4,667,763 teaches transmission of electrical signals, radio signals or acoustic signals to apply power through a relay to a solenoid for controlling a safety valve.

Remote operation of a valve may be accomplished with a pyrotechnic or explosive device. One technique for remotely controlling the release of fluid from an accumulator, for example, employs a pyrotechnic valve. U.S. Pat. No. 4,619,285 discloses a valve which utilizes the explosive gas from a pyrotechnic device located in the valve body to move a piston and thereby free a spool, releasing gas to a normally stowed inflation system. In a similar manner, U.S. Pat. No. 3,900,211 discloses a fast-dump valve for releasing compressed fluid upon command to an inflatable automobile seatbelt. It is also known that pyrotechnic devices may be activated in response to acoustic signals.

Each environment in which a valve is used and the function that valve serves in the overall system define a set of conditions which influence preferred techniques for remotely controlling the valve in that environment. The subsea environment and the control of valves in fluid transmission lines, such as those used for transmitting gas from offshore wells to land-based distribution systems, create unique problems. Conventional fluid control lines, electrical wires, or other conduits between the operator station and the remote underwater valve are often not economically practical. Nevertheless, extremely high reliability is demanded of the technique used to control such valves, since valve operation at critical times effectively regulates the flow of fluid in the pipeline system. Also, each of a plurality of subsea valves in a gas transmission pipeline may rarely require operation, although the system may not allow for occasional testing of the valve operation, so that one cannot effectively determine that a particular valve is no longer operational until after it failed its intended function. This failure could result in a hazardous condition and cause severe economic loss.

Accordingly, most prior art subsea valves in gas transmission pipeline systems are not operated remotely, but rather are manually opened or closed when required. A diver or robot typically is sent subsea to locate the valve, verify its position and thus the function of the valve in the pipeline system, and manually open or close the valve as instructed. Although considerable expense and delays are necessarily associated with this technique, the environment in which the valve is placed and the function of the valve are such that remote control of the valve is generally considered impractical.

A previous system for remotely controlling valves in a subsea gas transmission line utilized acoustic signals for locating and controlling operation of the pipeline ball valves. The system utilized gas pressure in the pipeline as the powering force for operating the ball valve actuator. This previous system has not been widely accepted in the industry, however, in part due to its high cost and concern regarding the reliable operation of the conversion of gas pipeline energy to hydraulic control circuit energy.

The disadvantages of the prior art overcome by the present invention, and improved techniques are hereinafter disclosed for reliably controlling operation of a remote fluid transmission pipeline.

SUMMARY OF THE INVENTION

An underwater valve in a fluid transmission pipeline is remotely controlled by an acoustic signal transmitted from the surface to the valve. A shaft directly coupled to the valve stem is subjected to a pre-existing torquing force, but is prevented from rotating due to a mechanical connection formed with an explosive bolt. An acoustic signal transmitted from the surface to the subsea assembly releases stored electrical energy to shear the bolt and thus break the mechanical connection to automatically achieve operation of the valve in that assembly.

According to a preferred embodiment, the necessary pre-existing force for one-time operation of the valve is stored in mechanical springs within a valve actuator, which were biased into a cocked position by fluid pressure. The cocked springs exert substantial rotational force on a shaft, which is then interconnected with a stationary intermediate control housing by the explosive bolt, so that the fluid pressure to the valve actuator may thereafter be released with the necessary valve operational force already applied to the shaft. The valve, valve actuator, and intermediate control housing may then be placed as an assembly in the subsea environment, with the valve in either the selected open or selected closed position. The bolt is severed by the release of stored electrical energy in response to the transmission of a coded acoustic signal. Shearing of the explosive bolt thus releases the pre-existing force applied by the springs, thereby rotating the valve stem and either opening or closing the valve. Valve operation reliability is high, since neither the generation nor the transmission of force required for operating the valve is controlled by the acoustic signal.

According to the method of the present invention, the valve is selectively moved to its open or closed position by applying hydraulic pressure to the valve actuator. Rotation of the valve stem to this position substantially biases springs within the actuator, creating a pre-existing torque, sufficient to operate the valve in its underwater environment, on the shaft directly coupled to the valve stem. The shaft is then substantially locked in the cocked position by the mechanical interconnection of the explosive bolt between the shaft and an intermediate housing stationary with respect to the valve body, so that the hydraulic pressure to the actuator may be removed. The assembly is then lowered subsea, with the torque necessary to operate the valve already acting on the shaft prior to generation of the acoustic signal. The acoustic signal initiates the release of stored electrical energy to sever the bolt, allowing the previously existing and independent force of the springs to operate the valve.

The technique of the present invention is cost effective, resulting in significant savings compared to conventional techniques which use divers or robots for regulating subsea fluid transmission lines. Also, valve control may be achieved quickly in an emergency, since the time required for placing additional men or equipment subsea is avoided.

It is thus a feature of the present invention to provide a reliable yet cost effective technique for operating an underwater valve in a fluid transmission line.

It is a further feature of the invention to provide methods and apparatus for operating an underwater valve by providing a predetermined torque for rotating the valve stem, applying that force to a shaft directly coupled to the valve stem, preventing that force from rotating the valve stem by a mechanical connection between the shaft and a stationary housing, then placing the assembly subsea, and finally transmitting an acoustic signal from the surface to the subsea valve to cause the release of the mechanical connection and thereby allow the pre-existing force to rotate the valve stem.

These and further features and advantages of the present invention will become apparent from the following detailed description, wherein reference is made to the figures in the accompanying drawings.

BRIEF DESCRIPTION OF THE DRAWINGS

FIG. 1 is a simplified pictorial view, partially in cross section, of an upper rotary valve actuator, an intermediate control housing assembly, and a lower valve in an underwater fluid transmission line according to the present invention.

FIG. 2 is a simplified side view of a portion of the apparatus shown in FIG. 1, further depicting an acoustic transponder assembly mounted to the intermediate control housing.

DESCRIPTION OF PREFERRED EMBODIMENTS

Figure 3:
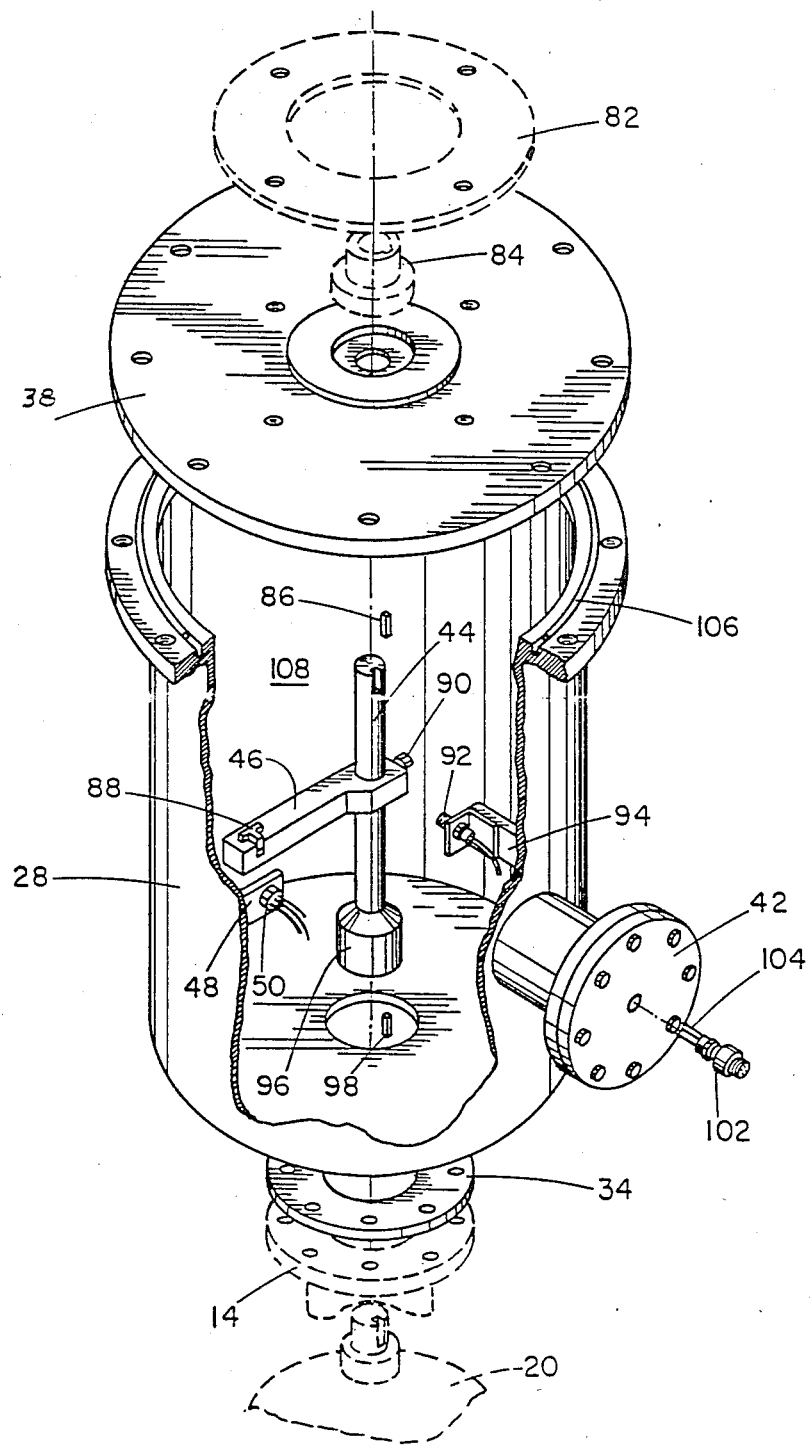
FIG. 3 is an exploded pictorial view of the control housing assembly shown in FIG. 1.

FIG. 1 depicts suitable apparatus according to the present invention for remotely controlling the flow of fluid in underwater pipeline 16. For purposes of describing the present invention, the pipeline 16 may be considered a portion of a hydrocarbon transmission system which passes oil or gas from a plurality of offshore wells to various land-based distribution centers. Those familiar with such subsea transmission system recognize that it is occasionally necessary to open or close a particular pipeline, e.g., for repair operations or for the addition of a new branch line into the main pipeline. The present invention is thus concerned with the remote control of subsurface valves in such pipelines.

FIG. 1 depicts a valve actuator 10, control housing assembly 12, and a ball valve 14 each fixedly bolted together. Although the components may be oriented with respect to each other in various arrangements, a typical installation would include the valve 14 lying on the sea floor, with the control housing 12 positioned vertically above the valve, and the actuator 10 on top of the control housing. Accordingly, actuator 10 is occasionally referred hereafter as the upper assembly, control housing 12 as the intermediate assembly, and valve 14 as the lower member, although these terms should not be understood as limiting, since they refer only to a suitable orientation of these components.

A pair of conventional transition members 18 provide connection between the pipeline and the flanged valve. Sphere or ball 20 in the valve includes passage 22 therethrough, so that 90° rotation of the valve stem 26 opens or closes the valve in a conventional manner. A plurality of seals 24 are provided for maintaining sealed engagement between the body of the valve and the valve stem, and thus isolate the interior of the valve and the pipeline from the subsea environment.

Valve 14 is simplistically shown in FIG. 1, e.g., without annular seals which seal between the valve body and the ball, since the concept of the presention invention is applicable to various types of valves having rotatable valve stems. A suitable ball valve is a Grove Model WE-XH-B-5 valve. Also, the valve 14 is shown in the normally closed position, so that the valve may be opened when necessary in response to an acoustic signal. It should be understood, however, that the valve may also be provided in the normally open position, in which case the technique of the present invention is used to close the underwater valve.

Control housing assembly 12 comprises a cylindrical-shaped body 28 with planar flanges 30 and 32 welded at its lower and upper ends. A gasket 34 is provided for sealing connection between flange 30 and valve 14 using bolts 36. A flange 38 is bolted to 32, and thus interconnects the actuator 10 to the intermediate assembly 12. A sleeve-like access stub 40 is welded at one end to the perimeter of the body 28 as shown, and is sealed at the other end by end plate 42. A substantially cylindrical-shaped cavity 108 is thus formed within the assembly 12, and is sealed from both the subsea environment and the interior of both actuator 10 and valve 14.

Actuator 10 is a conventional fluid powered valve actuator, and accordingly is simplistically shown in FIG. 1. An actuator shaft 52 is rotatably mounted within the body 11, with its upper end 54 extending from the body for viewing the rotational position of the shaft 52, and its lower end interconnected to control shaft 44 by coupling 84. A piston 51 is slidably mounted on the shaft 52, and sealingly separates an upper chamber 53 within the actuator from a lower chamber 55. As the piston moves axially with respect to the body 11, it is forced to rotate by sliding engagement of a key fixed to the body 11 and positioned within a spiral slot (not shown) in the piston. Axial movement of the piston 51 thus causes rotational movement of the shaft 52. When the piston 51 is forced in its downward position, bellville washers 57 are compressed, and thus exert a substantial upward force on the piston, which in turn creates a high torquing force on the shaft 52. A suitable commercially available actuator is the Danfoss Model BRCF-022 single-acting balanced rotary hydraulic actuator.

The actuator shaft 52, the control shaft 44, and the valve stem 26 are thus each axially aligned within the bodies of the respective actuator housing, intermediate housing, and valve body. The shafts are also mechanically directly connected, so that rotation of the actuator shaft necessarily causes rotation of the control shaft and the valve stem. As explained below and as shown in FIG. 3, the actuator shaft 44 may be temporarily fixed to the body 28 by an explosive bolt 50, which is severed in response to an acoustic signal from the surface to the subsea valve, thereby operating the valve.

FIG. 2 depicts a side view of the actuator 10, the control housing 12, and a portion of valve 14. A bracket 74 weldably affixed to the body 28 and U-bolts 76 are provided for mounting an acoustical transponder unit 72 to the control housing. Transponder unit 72 is provided with a plurality of lithium-sulfur dioxide batteries 75 for storing electrical energy. Electrical circuitry 77 is also provided in the transponder unit 72 for generating control signals in response to receipt of the acoustic signals, and for transmitting valve position signals back to the surface. A subsea electrical cable 78 passes electrical power from the batteries 75 to the explosive bolt 50, and relates control and feedback signals between the control housing assembly 12 and the transponder unit 72.

FIG. 3 depicts an exploded view of the control housing assembly shown in FIGS. 1 and 2. The control shaft 44 has an arm 46 affixed thereto, and extends radially therefrom so that its radially outward end is adjacent to body 28. Plate 48 is affixed to the internal surface of body 28, and includes an aperture for receiving an explosive bolt 50. An insert 88 in arm 46 is adapted for receiving the threaded end of the bolt 50. When assembled, the arm 46, insert 88, bolt 50 and plate 48 thus form a mechanical linkage or connector which structurally interconnects the stationary body 28 with the shaft 44, thereby preventing the shaft 44 from rotating until the bolt 50 has exploded to release the mechanical connection.

The shaft 44 is rotatably mounted within the housing 28 and is interconnected with shaft 52 of the actuator by coupling 84 and key 86. FIG. 3 depicts a groove 106 for receiving an O-ring, which seals with plate 38 for forming a sealed cavity 108 in the interior of the housing assembly. Upper gasket plate 82 is provided for sealing between the actuator assembly 10 and the plate 38, while a similar gasket 34 provides sealing engagement with the valve 14. When the assembly shown in FIG. 1 is subsea, the explosive bolt 50 is thus housed within a sizable gas chamber 108, so that substantially all of the force from the explosion of the bolt will be absorbed within the gas chamber, and sizable shock waves will not be transmitted to the actuator 10 and the valve 14. A lower end of the shaft 44 is shown with an enlarged section 96 for fitting over the end of valve stem 26, so that the valve stem and control shaft may be conventionally interconnected with key 98. It should be understood that any number of suitable mechanical connectors, such as keyed or splined couplings, may be used for interconnecting the valve stem with the control shaft, and the control shaft with the actuator shaft.

As previously noted, it is a feature of the present invention that the axes of the valve stem, the control shaft, and the actuator shaft be axially aligned, as shown in Figure 1. Moreover, the ends of the shaft are preferably directly connected to increase reliability and reduce costs. In other words, no linkage arms, gears, fluid flow conduits, electric signals or other members need be used to translate rotational motion of one shaft into corresponding motion of another shaft. The shafts instead are directly connected, with a simple mechanical coupling used to rotationally fix the shafts together.

FIG. 3 depicts a proximity sensor 92 mounted to bracket 94 fixed within the control housing 28. In the position shown in FIG. 3, the sensor slug 90 on the arm 46 is spaced from 92 such that the proximity sensor generates a valve closed signal. Arm 46 will rotate 90° when the valve is opened, which will automatically bring sensor slug 90 in close proximity to 92 to generate a valve opened signal from the proximity sensor. Although only one proximity sensor is shown in FIG. 3, it should be understood that similar sensors may verify that the valve remains in the position with the arm 46 mechanically secured to the body 28, or may be spaced about the perimeter of the body 28 in order to determine how rapidly the valve is closing or opening.

FIG. 3 also depicts a suitable electrical connector 102 for positioning within end plate 42. Electrical connector 102 and wires 104 are protected from the subsea environment thus interconnect the subsea electrical cable 78 from the transponder to both the proximity sensor 92 and the explosive bolt 50.

The method of the present invention will now be described. Before placing the actuator 10, control housing assembly 12, and the valve 14 in the subsea environment, the torque required to operate the valve will be known or presumed, taking into consideration the anticipated pressure in the flow line 16. Using an appropriate margin for safety, an actuator 10 will be selected for generating at least a preselected torque on the control shaft, so that this torque, once released in response to the acoustic signal, will be used to operate the valve in its subsea environment.

Assuming the subsea valve is to be a normally closed valve as shown in FIG. 1, the actuator, control housing, and valve may be assembled at the surface, and the valve moved to the valve open position. Hydraulic fluid pressure from a suitable source (not shown) may then be applied to the chamber 53 above the piston, with chamber 55 vented to atmosphere, to drive the piston 51 downward, thereby simultaneously compressing the springs 57 and rotating the actuator shaft 90° to close the valve. With hydraulic pressure still applied to the actuator 10, the shaft 44 is secured to the housing 28 by bolt 50, as previously described, with the operator working through the access port through 40. Hydraulic pressure may then be released from the actuator 10, so that the force from the bellville washers 57 is exerting a substantial torque on the shaft 52, which is opposed by the torque provided through the mechanical connection of the arm 46 with the housing 28. This pre-existing torque from the bellville washers 57 is subsequently utilized to operate the valve, and will be released when the mechanical connection formed by the explosive bolt 50 is severed.

Operation of the valve at the surface may be observed prior to forming this mechanical connection by applying pressure to the actuator to close the valve, and releasing the pressure to allow the springs to reopen the valve. Once the valve operation is assured, the predetermined force may again be applied to the actuator shaft, and chambers 53 and 55 above and below the piston brought in fluid communication by interconnecting line 64. Since the upper and lower faces of the piston exposed to fluid pressure are identical and the fluid chambers are interconnected, fluid pressure will not increase in either chamber as the piston subsequently moves during operation of the valve. The end plate 42 may then be installed to seal the chamber 108, and the valve 14, control housing 12, and actuator 10 then lowered subsea as an assembly to control flow in the line 16.

Referring to FIG. 2, if it becomes necessary to open the valve, a signal from a surface controller 110 located on either a ship or helicopter may be transmitted from the surface of the water to the valve. A coded acoustic signal from a transducer 112 placed slightly below the surface of the water will be directed toward the subsea valve in response to control from the ship or helicopter. The coded acoustic signal, preferably in the 5 to 15 KHz range, will be received by the acoustic transducer 71 of the transponder and control unit 72. Electronics 77 will determine by the code if the acoustic signal is being sent to operate that specific subsea valve, since each valve will be responsive to only a specific coded acoustic signal. In response to receipt of the correct coded acoustic signal, a control signal will be generated by electronics 77, causing a release of electrical energy from the battery pack 75 to the explosive bolt 50. Severing of the bolt 50 will thus break the mechanical connection between the shaft 44 and the housing 28, so that the predetermined torque from the springs in the actuator will automatically open the valve.

The assembly as described herein is particularly suited for one-time operation of a valve, i.e., from the valve closed to the valve open position, or from the valve open to the valve closed position. Nevertheless, the quick-disconnect couplings 65 at the end of interconnecting line 64 could be removed, and a diver with a fluid pressure pack (not shown) could connect new lines to increase pressure in chamber 53 while venting chamber 55 to an accumulator, thereby moving the piston 51 downward and reclosing the valve. Thus the valve remains operational in an emergency to either the open or the closed positions. The valve, the actuator, or the control housing assembly may be configured so that the flow controlling member in the valve, whether a ball or plate, would be rotated from a first flow control position to a second flow control position in response to the predetermined torquing force. The first and second positions thus need not be the valve fully open and valve fully closed positions.

A pyrotechnic device other than a bolt could be used for interconnecting the shaft 44 with the housing 28. For example, the pyrotechnic stop member could be directly affixed to the housing, so that electrical energy transmitted to the pyrotechnic device severs the stop from the housing 28, and allows the arm 46 to swing as the shaft 44 rotates in response to the predetermined force in the actuator.

Other removable interconnection devices could be employed and will be suggested from the above description. For example, the coded acoustic signal may generate a control signal which causes a drop in fluid pressure to a spring-biased control piston, which is normally held open by the presence of that fluid pressure. The loss of fluid pressure to the control piston thus causes the release of electrical energy to a solenoid, so that the solenoid plunger was retracted to effectively remove the obstruction which prevented the swing arm from rotating. In still another embodiment, a pyrotechnic valve responsive to the acoustic signal could be actuated to release fluid pressure from the "piston side" of a piston in an actuator so that the pre-existing spring force in the actuator on the "rod side" would then force the piston upward and actuate the valve. It is thus important according to the present invention that the predetermined force for operating the valve be applied to a shaft directly coupled to the valve stem before the valve is positioned subsea, so that the acoustic signal need only cause the removal or deactivation of the opposing force to allow the predetermined torquing force to act on the valve.

A suitable unit 110 for generating signals at the surface is the Ferranti O.R.E. Model TM821 surface controller, and a suitable acoustic transducer 112 for transmitting acoustic signals to the subsea valve is the Ferranti O.R.E. Model 601C omnidirectional acoustic transducer. A suitable transponder and control unit 72 for receiving the acoustic signal and for relating a signal indicative of the valve operational position is the Ferranti O.R.E. Model TM822 telemetry transponder.

Various features and modifications may be made without departing from the spirit or scope of the present invention. For example, various other commercially available valve actuators may be used for generating the predetermined torque necessary to operate the valve. The predetermined mechanical biasing force of springs is preferable, since the system is inexpensive and highly reliable. Those skilled in the art will understand, however, that other techniques could be used for applying a predetermined torquing force to an actuator shaft. For example, fluid pressure from a subsea accumulator could be employed for continually acting on a rotatable piston, which was prevented from moving and thus rotating while its rotatably connected internal shaft was fixed to the intermediate housing by the explosive bolt.

Although the invention has been described in terms of the specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Apparatus for remotely controlling operation of a subsea valve in a fluid transmission pipeline with an acoustic signal transmitted from the surface to the subsea valve, the valve including a valve stem rotatable for controlling the flow of fluid through the valve body and thus the transmission line, the apparatus comprising:
 a control housing fixedly connected to the valve body;
 a valve actuator housing fixedly connected to the control housing;
 an actuator shaft rotatably mounted within the valve actuator housing;
 biasing means for applying a preselected torque to the actuator shaft;
 a control shaft rotatably mounted within the control housing and interconnected at one end to the valve stem and at the other end to the actuator shaft;

mechanical connector means for removably interconnecting the control shaft and the control housing to prevent the biasing means from rotating the control shaft; and disconnecting means adjacent the subsea valve for automatically deactivating the mechanical connector means in response to the acoustic signal, such that deactivation of the mechanical connector means automatically operates the valve in response to the preselected torque of the biasing means.

2. The apparatus as defined in claim 1, wherein:
the disconnecting means supplies electrical energy; and
the mechanical connector means includes a pyrotechnic securing member functionally obliterable in response to the electrical energy from the disconnecting means.

3. The apparatus as defined in claim 2, further comprising:
sealing means for forming a gas cavity within the control housing sealed from the subsea environment; and
the pyrotechnic securing member is positioned within the gas cavity.

4. The apparatus as defined in claim 2, wherein the disconnecting means comprises:
a subsea receiver for receiving the acoustic signal and generating a disengaging signal in response thereto; and
electrical storage means for transmitting electrical energy to the pyrotechnic securing member in response to the disengaging signal.

5. The apparatus as defined in claim 1, wherein the mechanical connector means comprises:
an arm fixedly secured to the control shaft and extending radially outward therefrom; and
a securing member removably interconnecting the arm and the control housing.

6. The apparatus as defined in claim 1, wherein the biasing means comprises:
spring means movable between an uncocked position and a cocked position for applying the preselected torque to the actuator shaft.

7. The apparatus as defined in claim 1, further comprising:
sensor means for sensing the rotational position of the valve stem and generating a position signal in response thereto; and
acoustic relay means for transmitting a second acoustic signal to the surface indicative of the position signal.

8. The apparatus as defined in claim 7, wherein the control housing is mounted on the valve body and the valve actuator housing is mounted on the control housing such that the axes of the valve stem, the control shaft, and the actuator shaft are substantially aligned.

9. Apparatus for remotely controlling a subsea valve operably powered by a valve actuator including an actuator shaft biased with a preselected torque, the valve including a valve stem rotatable for controlling flow of fluid through the valve body, the apparatus comprising:
a control housing fixedly mounted to the valve body;
a control shaft rotatably mounted in the control housing and having one end interconnected with the valve stem and the opposing end interconnected with the actuator shaft;
mechanical connector means for removably interconnecting the control shaft and the control housing to prevent the biased actuator shaft from rotating the control shaft;
acoustic transmission means at the surface for transmitting an acoustic signal at a selected frequency to the subsea valve;
subsea receiver means adjacent the valve for receiving the transmitted acoustic signal and generating a deactivation signal in response thereto; and
electric storage means adjacent the subsea valve for functionally obliterating the mechanical connector means in response to the deactivation signal, such that obliteration of the connector means automatically operates the valve in response to the biased actuator shaft.

10. The apparatus as defined in claim 9, further comprising:
the mechanical connector means includes a pyrotechnic securing member functionally obliteratable by the electrical energy from the electrical storage means; and
sealing means for forming a gas cavity within the control housing for sealing the pyrotechnic securing member from the subsea environment.

11. The apparatus as defined in claim 9, wherein the mechanical connector means comprises:
an arm fixedly secured to the control shaft and extending radially outward therefrom; and
a securing member removably interconnecting the arm and the control housing.

12. The apparatus as defined in claim 9, further comprising:
sensor means for sensing the rotational position of the valve stem and generating a position signal in response thereto; and
acoustic relay means for transmitting a second acoustic signal to the surface indicative of the position signal.

13. A method of remotely controlling operation of a subsea valve in a fluid transmission pipeline, the valve including a valve stem rotatable for controlling the flow of fluid through the valve body and the transmission pipeline, the method comprising:
providing a control housing fixed to the valve body and a control shaft rotatable within the control housing;
mechanically coupling the valve stem and the control shaft;
biasing the control shaft at the surface with a preselected torque sufficient to operate the valve in the subsea environment;
thereafter mechanically interconnecting the control shaft and the control housing to prevent rotation of the valve stem in response to the preselected torque;
thereafter placing the valve and interconnected control housing in the subsea environment, with the preselected torque acting on the valve stem;
transmitting an acoustic signal from the surface to the subsea valve; and
disengaging the mechanical connection in response the acoustic signal, such that the disengagement of the mechanical connection automatically operates the valve in response to the preselected torque.

14. The method as defined in claim 13, wherein the step of disengaging the mechanical connection means comprises:

providing an electrical storage device adjacent the subsea valve; and releasing electrical energy from the storage device to disengage the mechanical connection.

15. The method as defined in claim 14, wherein:

the control shaft and the control housing are mechanically interconnected with a pyrotechnic device; and the mechanical connection is disengaged by functionally obliterating the pyrotechnic device in response to the electric energy from the storage means.

16. The method as defined in claim 15, further comprising:

providing a sealed gas cavity within the control housing for receiving the pyrotechnic device.

17. The method as defined in claim 13, wherein the step of biasing the control shaft comprises:

providing a preselected spring biasing force to the control shaft.

18. The method as defined in claim 13, wherein the step of mechanically interconnecting the control shaft in the control housing comprises:

fixedly securing an arm to the control shaft which extends radially outward therefrom; and securing a radially outward end of the arm to the control housing.

19. The method as defined in claim 13, further comprising:

sensing the rotational position of the valve stem and generating a position signal in response thereto; and relating an acoustic signal to the surface indicative of the position signal.

20. The method as defined in claim 13, wherein the step of biasing the control shaft includes applying a biasing force at the surface to a piston in an actuator housing, coupling the piston to a rotatable actuator shaft, and coupling the rotatable actuator shaft to the control shaft, and the method further comprises:

providing fluid input ports through the actuator housing for inputting pressurized fluid through the actuator housing while in the subsea environment to move the piston and thus rotate the control shaft to control the flow of fluid through the valve body.

* * * * *